United States Patent
Kiszka (10) Patent No.: US 10,003,384 B2
(45) Date of Patent: Jun. 19, 2018

(54) DOCKING STATION FOR A WIRELESS ENERGY AND DATA CONNECTION

(71) Applicant: SIEMENS AKTIENGESELLSCHAFT, München (DE)

(72) Inventor: Jan Kiszka, München (DE)

(73) Assignee: Siemens Aktiengesellschaft, München (DE)

( * ) Notice: Subject to any disclaimer, the term of this patent is extended or adjusted under 35 U.S.C. 154(b) by 17 days.

(21) Appl. No.: 14/417,729

(22) PCT Filed: Jun. 6, 2013

(86) PCT No.: PCT/EP2013/061687
§ 371 (c)(1),
(2) Date: Jan. 27, 2015

(87) PCT Pub. No.: WO2014/019747
PCT Pub. Date: Feb. 6, 2014

(65) Prior Publication Data
US 2015/0270874 A1 Sep. 24, 2015

(30) Foreign Application Priority Data
Jul. 30, 2012 (DE) ................... 10 2012 213 363

(51) Int. Cl.
*H04B 5/00* (2006.01)
*H04W 12/04* (2009.01)
(Continued)

(52) U.S. Cl.
CPC ......... *H04B 5/0037* (2013.01); *G06F 1/1632* (2013.01); *H02J 5/005* (2013.01);
(Continued)

(58) Field of Classification Search
CPC ..... H04W 88/02; H04W 12/04; H04W 12/02; H04M 1/72527; H04M 1/7253;
(Continued)

(56) References Cited

U.S. PATENT DOCUMENTS

2010/0131691 A1* 5/2010 Chatterjee ............... G06F 1/26
710/303
2010/0146308 A1 6/2010 Gioscia et al.
(Continued)

OTHER PUBLICATIONS

ECMA International, NFC-SEC-01: NFC-SEC Cryptography Standard Using ECDH and AES, Jun. 2010, 2nd Edition.
(Continued)

*Primary Examiner* — Kamran Afshar
*Assistant Examiner* — Nicole Louis-Fils
(74) *Attorney, Agent, or Firm* — Lempia Summerfield Katz LLC (57) ABSTRACT

The embodiments relate to a docking station for a mobile electronic device. The energy supply and the data exchange between the docking station and the mobile electronic device is carried out in a wireless manner. The wireless energy supply and the wireless data connection are configured to each other. The initialization process for connecting the mobile electronic device to the docking station may be carried out in a fully automatic manner.

9 Claims, 3 Drawing Sheets

(51) Int. Cl.
*H04L 9/08* (2006.01)
*H04W 12/02* (2009.01)
*H04L 9/00* (2006.01)
*H02J 50/10* (2016.01)
*H02J 50/80* (2016.01)
*G06F 1/16* (2006.01)
*H02J 7/02* (2016.01)
*H02J 5/00* (2016.01)
*H02J 7/00* (2006.01)

(52) U.S. Cl.
CPC .............. *H02J 7/025* (2013.01); *H02J 50/10* (2016.02); *H02J 50/80* (2016.02); *H04B 5/0031* (2013.01); *H04B 5/0075* (2013.01); *H04L 9/00* (2013.01); *H04L 9/0861* (2013.01); *H04W 12/04* (2013.01); *H02J 7/0044* (2013.01); *H04W 12/02* (2013.01)

(58) Field of Classification Search
CPC ........ H04M 1/725; G06F 1/1632; H04B 5/00; H04L 9/08; H04L 9/00
USPC ......... 455/557, 573, 575.1, 574, 572, 550.1, 455/411, 404, 410; 713/171, 168, 190
See application file for complete search history.

(56) References Cited

U.S. PATENT DOCUMENTS

| | | | |
|---|---|---|---|
| 2011/0248674 A1* | 10/2011 | Baarman | H02J 7/025 320/108 |
| 2012/0032632 A1 | 2/2012 | Soar | |
| 2012/0042087 A1* | 2/2012 | Berg | H04L 63/08 709/229 |
| 2012/0256585 A1* | 10/2012 | Partovi | H01F 5/003 320/108 |
| 2013/0236007 A1* | 9/2013 | Munro | H04L 9/0861 380/44 |

OTHER PUBLICATIONS

German Office Action dated Jul. 1, 2014, for corresponding DE 10 2012 213 363.1, with English Translation.
PCT International Search Report, dated Sep. 13, 2013, for Corresponding PCT/EP2013/061687 with English Translation.

\* cited by examiner

DOCKING STATION FOR A WIRELESS ENERGY AND DATA CONNECTION

CROSS-REFERENCE TO RELATED APPLICATIONS

The present patent document is a § 371 nationalization of PCT Application Ser. No. PCT/EP2013/061687, filed Jun. 6, 2013, designating the United States, which is hereby incorporated by reference, and this patent document also claims the benefit of DE 10 2012 213 363.1, filed on Jul. 30, 2012, which is also hereby incorporated by reference.

TECHNICAL FIELD

The present embodiments relate to a docking station for connecting a mobile electronic device, to a docking system for connecting a mobile electronic device to a docking station, and to a method for coupling a mobile electronic device to a docking station.

BACKGROUND

A multiplicity of electronic devices are mobile electronic devices nowadays. These mobile electronic devices may contain an energy store, for example, in the form of a rechargeable battery (e.g., storage battery). Such devices may therefore be used in a spatially flexible manner independently of a stationary energy supply connection.

In this case, the useful life of such a mobile electronic device with rechargeable batteries is very greatly dependent on the capacity of the batteries. At the latest when the energy stored in the battery runs out, the electronic device is connected to a stationary energy supply again in order to charge the battery and enable continued operation of the device.

Figure 1:
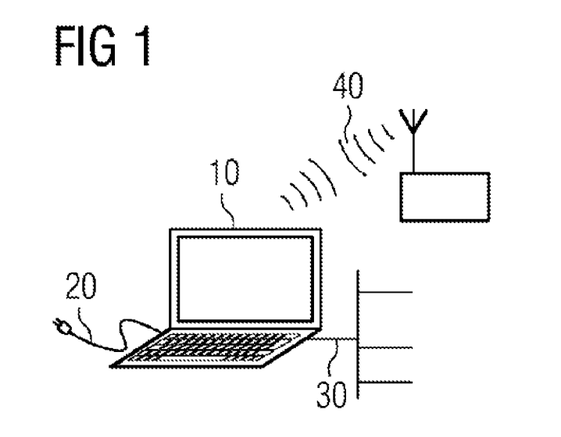
FIG. 1 depicts a schematic illustration of a connection of an electronic device in the case of a stationary energy supply according to the prior art.

As illustrated in FIG. 1, it has usually been necessary to date to connect the mobile electronic device 10 to a voltage supply using a cable connection 20. A connecting cable with suitable plug-in connections for the respective electronic device is required for this connection. If a user does not have this special connecting cable to hand, it is not possible for the user to connect the electronic device to the energy supply. Continued operation and charging of the battery are not possible in this case.

Another problem with connecting a mobile electronic device using a connecting cable is that the contacts of the electronic device and of the connecting cable are mechanically stressed during each connecting process. Therefore, after a multiplicity of connecting processes, there is the risk of the contacts wearing away or being damaged. Therefore, the quality of contact-connection between the connecting cable and the electronic device may be impaired over time.

In order to make it possible to connect the mobile devices as conveniently as possible and furthermore also in a mechanically gentle manner during the charging process, a so-called docking station is offered for many mobile devices. This is an apparatus into which the mobile electronic device may be inserted. When inserting the device, the device is guided in such a manner that the connections of the mobile device form a secure connection with the connections in the docking station. The connection of the electronic device is therefore protected during connection and release. Nevertheless, impairment of the contacts may not be permanently precluded. Furthermore, such docking stations may be designed for a very specific type of device. Therefore, it is not possible to connect devices of a different configuration using such a specialized docking station.

In addition, many modern electronic devices require an interface for interchanging data. In particular, mobile electronic devices, (for example, portable computers (e.g., notebooks), tablet PCs, or smartphones), require a connection to a data network for their operation.

Such a network connection for interchanging data may be effected using a wired connection 30. For this purpose, a suitable connecting cable, which may be used to provide a network connection, may be connected to the electronic device, for example. Since the data connection is made using a physical cable in this case, a very secure connection with a relatively high data rate may be achieved in this manner. On the other hand, the mechanical connection very greatly restricts the mobility of the electronic device.

Alternatively, a network connection may also be established using a radio connection 40, in particular in the case of mobile electronic devices. For example, data connections using a wireless network (WLAN) or a mobile radio connection (for example, GPRS, UMTS, LTE, etc.) are possible in this case.

However, in the case of such wireless data transmissions, it is possible for the data transmission to be intercepted by third parties. Therefore, the data may be transmitted in encrypted form. In this case, it is necessary to agree on a key, on which the encryption of the data transmission is based, before starting data transmission between the mobile electronic device and the counterpart station.

Furthermore, the maximum data rate that may be achieved during wireless data transmission is subject to severe restrictions. As long as only a small number of mobile electronic devices share a common radio connection, a relatively good data rate may be achieved. However, if increasingly more electronic devices are inside a particular area, the maximum data rate that may be achieved falls very quickly. This results in very unsatisfactory network connections since the multiplicity of mobile devices with radio connections influence and therefore hinder each other in this case.

There is therefore a need for a reliable and simultaneously flexible connection of mobile electronic devices for simultaneous energy supply and data connection.

SUMMARY AND DESCRIPTION

The scope of the present invention is defined solely by the appended claims and is not affected to any degree by the statements within this summary. The present embodiments may obviate one or more of the drawbacks or limitations in the related art.

One concept is to connect a mobile electronic device in a locally limited area to a docking station in a completely contactless manner. In this case, both the energy transmission and the data transmission are carried out without a mechanical connection. In this manner, the user does not require any additional cables or plug-in connections at all that may be forgotten or lost. In addition, on account of the contactless connection, no mechanical problems whatsoever, for example damaged or bent contact pins, may occur either.

This completely wireless connection of a mobile device to a docking station also does not require any special plug-in connections at all, with the result that a multiplicity of different device types may be very easily connected to such a docking station.

Another advantage of the combination of joint energy transmission and data connection in a single docking station results from the boundary condition that wireless energy transmission is possible only over a very limited range. The transmission power for the data transmission may therefore also be restricted to this limited range. On account of this low transmission power, the risk of mutual interference and impairment of adjacent radio connections is also reduced. This results in a particularly reliable data connection with a high data rate.

One embodiment therefore includes a wireless docking station for a mobile electronic device, including a first data transmission device and a first energy transmission device. The first data transmission device is designed to carry out wireless data transmission between the docking station and the mobile electronic device. The first energy transmission device is designed to carry out wireless energy transmission between the docking station and the mobile electronic device.

The embodiments also include a method for coupling a docking station and a mobile electronic device, including: detecting when the mobile electronic device approaches the docking station; initializing wireless energy transmission from the docking station to the mobile electronic device; generating key data for encrypted data interchange between the docking station and the mobile electronic device; interchanging the key data between the docking station and the mobile electronic device at least partially with the inclusion of the wireless energy transmission from the docking station to the mobile electronic device; and setting up an encrypted data connection between the docking station and the mobile electronic device.

The wireless energy transmission between the docking station and the mobile electronic device may be inductive energy transmission. In the case of such inductive energy transmission, the energy is transmitted using an alternating magnetic field. Since such an alternating magnetic field passes through a plastic housing of a device virtually without interference, it is very highly suitable for wireless energy transmission.

In one embodiment, the docking station includes a key generator for generating key data. The first data transmission device is designed in this case to encrypt the data transmission between the docking station and the mobile electronic device on the basis of the generated key data. A very secure data connection between the docking station and the mobile electronic device may therefore be set up using the key data generated in the key generator.

In one particular embodiment, the first data transmission device in the docking station is designed to vary the transmission power of the wireless data transmission, and to limit the transmission power in the process to a predetermined value until a predefined registration process has been concluded between the docking station and the mobile electronic device. This limitation of the transmission power during the registration process provides that the mobile electronic device to be connected is in the immediate vicinity of the docking station. Therefore, it is rendered difficult or impossible for other devices at a greater spatial distance to intercept the data transmission during registration.

The predefined registration process may include at least the interchange of key data. These very sensitive key data are therefore particularly well protected.

In another embodiment, the docking station also includes a modulator, which is designed to modulate the wireless energy transmission between the docking station and the mobile electronic device. This modulation of the energy transmission additionally makes it possible to also interchange data between the docking station and the mobile electronic device via this energy transmission channel.

In another embodiment, the docking station may include a key generator for generating key data, and the first data transmission device is designed to encrypt the data transmission between the docking station and the mobile electronic device on the basis of the generated key data; the modulation of the energy transmission between the docking station and the mobile electronic device being at least partially based on the generated key data. Therefore, the key data are transmitted from the docking station to the respective mobile electronic device by particularly secure transmission.

In another embodiment, the docking station also includes a detector, which is designed to monitor the wireless energy transmission between the docking station and the mobile electronic device. The detector may detect when a mobile electronic device approaches the docking station. Such a detector is able to detect an approaching mobile electronic device, which becomes noticeable by an energy decrease in the energy field provided. Furthermore, the detector may also be used to detect a changing behavior in the energy decrease and configure the energy transmission power.

According to one embodiment, the docking station also includes a communication interface, which is designed to provide a signal based on data transmission by the first data transmission device. Such a communication interface may be used, for example, to connect an external data source such as a hard disk or the like. Furthermore, such an interface may also be used to forward an audio or video signal to an external device.

In one embodiment, the communication interface provides an input and output signal based on bidirectional data transmission by the first data transmission device. Therefore, data may be both transmitted and received via this communication interface.

One embodiment includes a wireless docking system including a docking station described above and a mobile electronic device having a second data transmission device, which is designed to carry out the wireless data transmission with the first data transmission device of the docking station, and a second energy transmission device, which is designed to carry out the wireless energy transmission with the first energy transmission device of the docking station.

In another embodiment, the wireless docking system includes a mobile electronic device having a demodulator, which is designed to extract a data signal from the wireless energy transmission. Additional data, in particular confidential data, may be gathered from this extracted data signal.

According to one embodiment, the abovementioned extracted data signal contains key data for encrypted transmission between the first data transmission device and the second data transmission device. Therefore, these sensitive key data may be interchanged in a very reliable and secure manner.

The refinements described below may be combined with one another in any desired manner if useful. Additional refinements and implementations also include combinations of features that are not expressly described in exemplary embodiments.

In this case, the accompanying drawings serve to understand the embodiments. They illustrate the described embodiments and, in conjunction with the description, are used to explain basic concepts. In this case, the elements in the drawings are not always drawn true to scale with respect to one another. Identical reference symbols denote identical or similarly acting components in this case.

DETAILED DESCRIPTION

A mobile electronic device in the sense of the following description first of all includes all movable devices that require electrical energy for their operation. This electrical energy may be provided by a rechargeable battery, a so-called storage battery. It may therefore be provided that the mobile device does not require a permanent wired connection to an energy supply.

In addition, the embodiments are aimed, in particular, at electronic devices that also have a communication interface for interchanging data. This may be a wireless network connection, for example.

Figure 2:
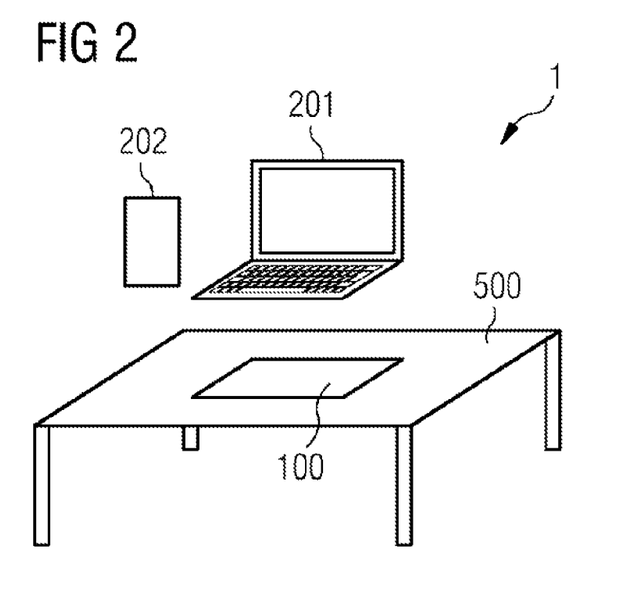
FIG. 2 depicts a schematic illustration of a docking system according to one embodiment.

FIG. 2 depicts a schematic illustration of a docking system 1. In this case, the docking system 1 includes a docking station 100 and a mobile electronic device, (for example, a notebook 201 or a tablet PC 202). Other mobile electronic devices, (for example, a mobile telephone, in particular a smartphone, or the like), may likewise be connected to the docking station 100.

The docking station 100 differs from the energy supply and network connection illustrated in FIG. 1 in that both the energy supply and the data transmission are carried out in a completely wireless manner. Therefore, there are no mechanical connections whatsoever between the docking station 100 and the mobile electronic devices 201 or 202.

In this case, as illustrated in FIG. 2, the docking station 100 may be integrated in a piece of furniture, for example, a desk 500. Alternatively, however, it is likewise possible for the docking station 100 to be in the form of a separate device and to be integrated, for example, in a flat mat such as a desk covering or the like.

In order to connect a mobile electronic device 201 or 202 to the docking station 100, it is merely necessary in this case to position the corresponding device 201 or 202 in the vicinity of the docking station 100. On account of the wireless communication between the docking station 100 and the mobile device 201 or 202, the mobile device is automatically detected by the docking station and a secure energy and data connection is established. The detailed connection set-up when a mobile device approaches a docking station 100 is described in yet more detail further below.

Figure 3:
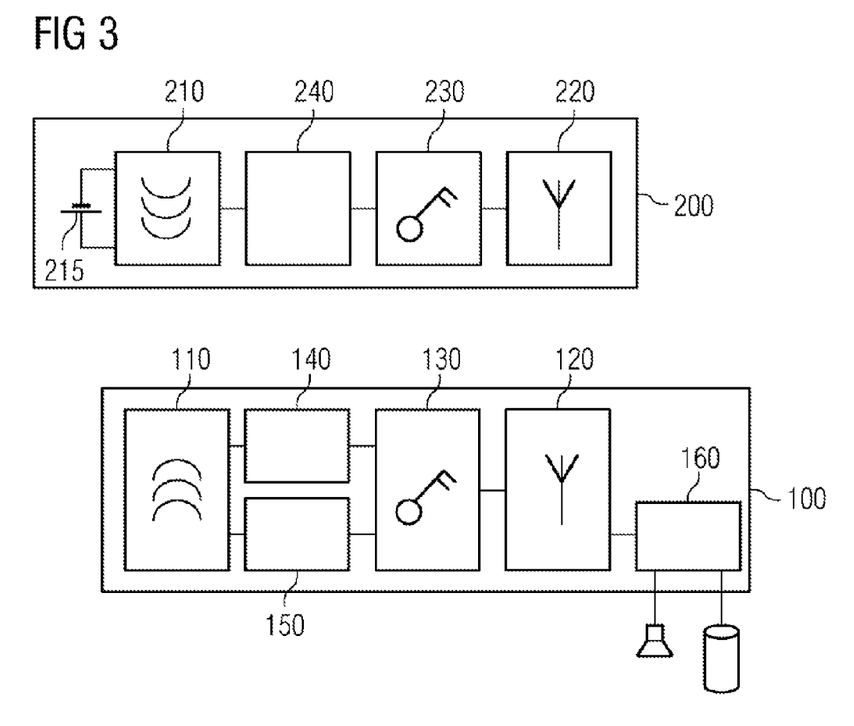
FIG. 3 depicts a schematic illustration of a docking station and a mobile electronic device according to one embodiment.

FIG. 3 depicts the detailed structure of a docking station 100 and of a mobile electronic device 200 according to one embodiment. In this case, the docking station 100 includes a first energy transmission device 110 and a first data transmission device 120. Accordingly, the mobile electronic device 200 includes a second energy transmission device 210 and a second data transmission device 220.

In this case, the first energy transmission device 110 of the docking station 100 generates an energy field. This energy field may be oriented in the direction of the mobile electronic device 200. For example, this energy field may be an alternating magnetic field. In this case, the energy transmission is inductive coupling. However, other energy fields, (for example, electromagnetic fields or the like), are also possible in principle if the energy fields are suitable for transmitting the required amount of energy from the docking station 100 to the mobile electronic device 200.

The second energy transmission device 210 of the mobile electronic device 200 receives the energy field and converts the received energy into electrical energy. This electrical energy may be used directly to operate the device 200. Alternatively or additionally, an energy store 215 may also be charged using the electrical energy from the energy transmission device 210. The energy store may be a rechargeable battery, for example.

If, for example, the energy is transmitted from the first energy transmission device 110 using inductive coupling by an alternating magnetic field, this magnetic field may induce a voltage in the second energy transmission device 210 of the mobile electronic device 200. The induced voltage may then be used to supply energy to the mobile electronic device 200 and/or to charge the storage battery 215.

The docking station 100 also includes a first data transmission device 120 and the mobile electronic device 200 includes a second data transmission device 220. Data may be hereby interchanged wirelessly between the docking station 110 and the mobile electronic device 200.

A wireless data transmission method that is already known may be fundamentally used to wirelessly interchange data between the docking station 100 and the mobile device 200. For example, radio data transmission known from the IEEE standard 802 may be used for this purpose. Such wireless data transmission is known under the term Wireless LAN (WLAN). However, other radio data transmission methods are likewise suitable.

Since the range for wireless energy transmission between the docking station 100 and the mobile device 200 is limited, the range for the data transmission between the first data transmission device 120 and the second data transmission device 220 may be accordingly configured and a radio connection with a relatively low transmission power may be used.

This limitation of the transmission power to a relatively low maximum level advantageously simultaneously reduces mutual impairment or interference of adjacent radio cells. Such adjacent radio cells may carry out further data transmissions with other electronic devices, for example. It may therefore be provided that a very high data transmission rate may be achieved on account of the slight mutual impairment. In addition, it is also possible to simultaneously operate a relatively large number of radio connections as a result of the low transmission power.

Wireless data transmissions harbor the risk of unauthorized interception. In order to exclude or at least reduce this risk, wireless data transmissions may be carried out in encrypted form. However, it is necessary to first of all store a common key for encrypting the data transmission in the transmitting and receiving stations for this purpose.

In order to be able to carry out encrypted transmission between the first data transmission device 120 and the second data transmission device 220, a common key is therefore available in the docking station 100 and in the mobile electronic device 200. The required key data may be provided for this purpose by a key generator 130 in the docking station 100, for example.

New key data may be respectively generated for each new connection between the docking station 100 and the mobile device 200. In this case, these newly generated key data is communicated to the respective mobile electronic device 200 while the connection is being set up.

For this purpose, it is possible to reduce the transmission power for interchanging data between the docking station 100 and the mobile electronic device 200 to such an extent that reliable communication is possible only over a minimum distance.

For example, the transmission power may be reduced to such an extent that the key data to be transmitted may be reliably received only when the docking station 100 and the mobile device 200 virtually touch or are only a few centimeters away from one another. Therefore, it is no longer possible for a receiver positioned further away to receive these key data unnoticed. This compulsorily very close arrangement may also provide that the correct mobile device 200 is respectively connected to the docking station 100.

After the key data have been interchanged and the further data transmission is carried out in encrypted form, the transmission power for the data transmission may then be increased, with the result that the mobile electronic device 200 may be somewhat further away from the docking station 100 and secure data transmission nevertheless takes place.

In order to further increase the security of the interchange of the key data between the docking station 100 and the mobile device 200, the key data are not interchanged, or are at least not exclusively interchanged, via the data channel between the first data transmission device 120 and the second data transmission device 220. Rather, at least some of these key data are interchanged via the wireless connection between the first energy transmission device 110 and the second energy transmission device 210.

In order to also be able to transmit data via the first energy transmission device 110 and the second energy transmission device 210, the energy field between these two energy transmission devices is modulated using a modulator 140. For example, a higher-frequency signal may be superimposed on the energy field for this purpose. Other modulation methods that are suitable for modulating the corresponding energy field are likewise possible.

While setting up a connection or whenever new key data are intended to be interchanged between the docking station 100 and the mobile device 200, the modulator 140 will receive the respectively valid, newly generated key data from the key generator 130 and will then modulate the energy field generated by the first data transmission device 110 in a suitable manner.

The second energy transmission device 210 of the mobile device 200 will receive this modulated energy field. A demodulator 240 will extract the data embedded in the energy field and will forward them to a key store 230.

The key data that have been generated by the key generator 130 may be transmitted in this case to a second energy transmission device 210 completely with the aid of the modulator 140 and the first energy transmission device 110 via the energy field and may be extracted by the demodulator 240.

Alternatively, only some parts of the key data generated may also be transmitted via the energy field, while a further part of the key data is interchanged between the first data transmission device 120 and the second data transmission device 220. In this case, the transmission power may be restricted to a predetermined, maximum value during the data transmission between the data transmission devices in order to avoid interception by another station.

The initiation for generating new key data and the subsequent interchange of these key data may be carried out automatically when a mobile electronic device 200 approaches the docking station 100.

Approach of a mobile electronic device 200 that is suitable for making contact with the docking station 100 may be automatically detected, for example, by monitoring the energy field provided by the first energy transmission device 110. For example, the first energy transmission device 110 may continuously provide an energy field having a predefined strength. As long as there is no suitable mobile electronic device 200 in the immediate vicinity of the docking station 100, the first energy transmission device 110 will not register any energy decrease in the energy field provided.

In contrast, if a suitable mobile electronic device 200 is moved into the vicinity of the docking station 100, the second energy transmission device 210 of the mobile device 200 may remove energy from the field provided. This energy decrease may be registered by the first energy transmission device 110. Approach of a suitable mobile electronic device 200 may therefore be registered and a connection may then be established between the docking station 100 and the mobile electronic device 200. While this connection is being set up, suitable key data may also be generated by the key generator 130 in this case.

These key data may then be interchanged between the docking station 100 and the mobile device 200, as described above.

In order to increase the security of data interchange even further at the beginning of a new connection and, in particular, to provide additional security while interchanging the key data, data communication may also be carried out in a bidirectional manner using the first energy transmission device 110 and the second energy transmission device 210. For this purpose, the second energy transmission device 210 may be expanded to the effect that the removal of energy from the energy field provided by the docking station 100 is accordingly modulated.

In this case, a detector 150 connected to the first energy transmission device 110 registers a variation in the energy field provided and evaluates this variation. On the basis of this variation in the energy field, the detector generates data that are provided for further processing in the docking station. In particular, these data may be forwarded to the key generator 130 that uses the data to generate the key data. It is therefore possible to achieve additional security when agreeing a common key between the docking station 100 and the mobile electronic device 200.

After the registration process and, in particular, the key interchange have been concluded, the docking station 100 changes to a further operating mode. In this operating mode in which the data transmission is carried out on the previously transmitted key data, the transmission power between the first data transmission device 120 and the second data transmission device 220 may be increased, for example, as a result of which the mobile electronic device 200 may also reliably interchange data at a correspondingly high data rate at a somewhat further spatial distance from the docking station 100.

Furthermore, in this further operating mode, the power of the first energy transmission device 110 may also be configured to the power requirement of the coupled mobile electronic device 200. A considerably higher power may be provided, (for example, for a notebook with an accordingly high energy requirement), while only a lower power is provided by the first energy transmission interface 110 for coupling to a smartphone or tablet PC.

For this purpose, the power removed from the energy field by the mobile device 200 may be determined, (for example, by the first energy transmission interface 110), and the energy field provided may then be configured.

Alternatively, it is likewise possible for a corresponding item of information relating to the mobile electronic device 200 to be coupled to also be simultaneously transmitted to the docking station 100 during the initialization process in which the data for key interchange are transmitted. The docking station 100 may then be automatically configured in such a manner that it is optimally configured to the mobile device 200 to be coupled.

In addition to configuring the energy to be wirelessly transmitted, this automatic configuration of the docking station 100 may also include configuration of the data interface 120 to the corresponding protocol and possibly suitable frequency band. Furthermore, further data for an optimal match between the docking station 100 and the mobile device 200 may also be interchanged during this initialization phase.

If a user wishes to prevent the automatic connection of a mobile device 200 to a docking station 100, the user may prevent this in a relatively simple manner by deactivating the interfaces 210 and 220 for wireless communication with the docking station 100. This may be carried out, for example, by simply actuating a mechanical switching element on the mobile device. Alternatively, it is likewise possible to make a corresponding software setting in the menu of the device 200.

The interchange of data between the first data transmission device 120 of the docking station 100 and the second data transmission device 220 of the mobile electronic device 200 is used for a network connection of the mobile electronic device 200 in most cases. For this purpose, the docking station 100 may be connected to a local area network via a cable connection. In addition to accessing a local area network, this may also be used to access the Internet, for example.

In addition, it is likewise possible to transmit yet further data via the data connection between the first data transmission device 120 and the second data transmission device 220. In particular, special audio and/or video data may be transmitted via this data connection, for example. These special audio and/or video data may be transmitted, for example, from the mobile electronic device 200 to the docking station 100 and may be converted into a corresponding audio and/or video signal in an output interface 160 suitable for this purpose. In this case, a loudspeaker or an audio device, which may be used to output the audio signal, may be connected to the interface 160, for example. In the case of a video signal, a corresponding video device, (for example, a projector, a large monitor, or another graphics output device), which may be used to display the video signal, may likewise be connected.

Furthermore, the interface 160 of the docking station 100 may also provide an interface connection for an external data device, for example, a printer, an external hard disk, a DVD drive, or the like. At present, there are a multiplicity of different interfaces for such connections. The interface 160 may thus be in the form of a USB connection, an SATA connection, or a further suitable interface connection, for example.

The interface 160 of the docking station 100 provides the interface needed to connect the external data device for this purpose. In addition, the interface 160 suitably converts the input and output signals and makes it possible to forward the data to the mobile electronic device 200 via the first data transmission device 120 and the second data transmission device 220. Whereas the above-mentioned audio and video data may be forwarded only in one direction, (such as from the mobile device 200 for output to the docking station 100), bidirectional data transmission is carried out between the docking station 100 and the mobile device 200 if a data device (e.g., hard disk, etc.) is connected.

In the embodiment illustrated in FIG. 3, the first energy transmission interface 110 and the first data transmission device 120 are arranged beside one another. Such an arrangement may be advantageous with regard to possible mutual impairment of the two interfaces.

Figure 4:
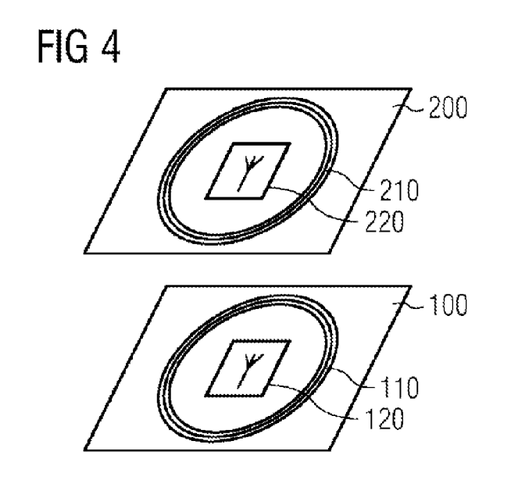
FIG. 4 depicts a schematic illustration of a docking station according to an alternative embodiment.

FIG. 4 depicts an alternative arrangement of the first energy transmission device 110 and the first data transmission device 120. As illustrated in this figure, the two interfaces 110 and 120 are arranged inside one another in this case, with the result that there is strong interleaving of the energy field and the wireless data signal. Further arrangements in the two interfaces 110 and 120 in which the two interfaces are interleaved in one another are likewise possible in this case.

Such spatial linking of the two interfaces enables an even closer connection of wireless energy supply and wireless data transmission. Therefore, even greater security may be achieved, in particular with regard to data security when transmitting the information between the docking station 100 and the mobile device 200.

Figure 5:
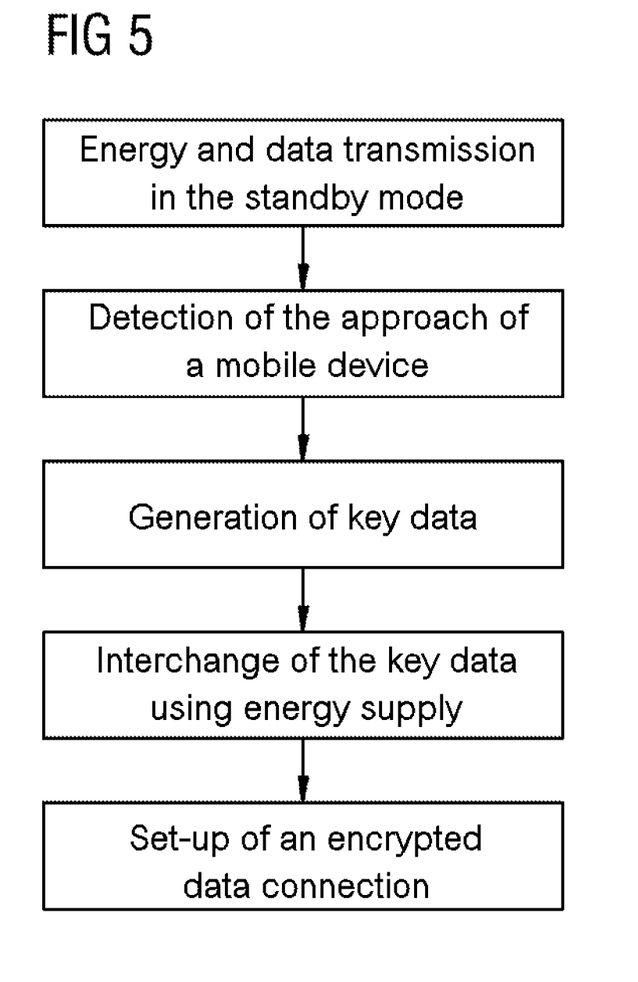
FIG. 5 depicts a schematic illustration of the sequence of setting up a connection between the docking station and the mobile electronic device according to one embodiment.

FIG. 5 depicts a flowchart for connecting a mobile electronic device 200 to a docking station 100. At the beginning, the docking station 100 is in a standby mode. In this standby state, the docking station 100 waits for the approach of a mobile electronic device 200. In this case, the first energy transmission device 110 may possibly limit the energy output to a predetermined maximum value.

Additionally or alternatively, the transmission power of the first data transmission device 120 may also be limited to a predetermined maximum value. It is likewise possible to first of all completely deactivate the data transmission device 120 and to activate the data transmission device 120 only after energy output to a mobile electronic device 200 has been detected.

Alternatively, it is likewise possible to first of all deactivate the energy transmission interface 110 and to activate the energy transmission only after a connection has been established between the data transmission device 120 and a mobile electronic device 200.

After the docking station 100 has registered that a mobile electronic device 200 is approaching the docking station 100 in the next act, the key generator 130 starts to generate the key data that are used as a basis for encryption between the docking station 100 and the mobile device 200.

The connection set-up between the docking station 100 and the mobile device 200 is then initialized. For this purpose, the previously generated key data are also interchanged between the two devices. If necessary, further system parameters, for example the power requirement of the mobile electronic device, are also transmitted during this initialization phase.

After the initialization of the connection set-up has been concluded, wireless energy transmission is carried out between the first energy transmission device 110 in the docking station 100 and the second energy transmission device 210 of the mobile device 200. In a parallel manner, encrypted data transmission is carried out between the first data transmission device 120 of the docking station 100 and the second data transmission interface 220 of the mobile device 200. In this case, the transmission power between the two data transmission devices 120 and 220 is configured in such a manner that, on the one hand, sufficiently stable data transmission may be carried out between the two devices and, on the other hand, the transmission power is nevertheless as low as possible, with the result that there is the slightest possible impairment of spatially adjacent devices.

In summary, the present embodiments relate to a docking station 100 for a mobile electronic device 200. The energy supply and the data interchange between the docking station 100 and the mobile electronic device 200 are carried out wirelessly in this case. The wireless energy supply and the wireless data connection are matched to one another in this case. The initialization process for connecting the mobile electronic device 200 to the docking station may be carried out in a fully automatic manner.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A docking station for a mobile communication device, the docking station comprising:
   a first data transmission device configured to carry out wireless data transmission between the docking station and the mobile communication device, and vary a transmission power of the wireless data transmission, wherein the first data transmission device is further configured to limit the transmission power to a predetermined value until a predefined registration process including an interchange of key data has been concluded between the docking station and the mobile communication device;
   a first energy transmission device configured to generate an energy field and carry out wireless energy transmission between the docking station and the mobile communication device, wherein wireless energy transmitted from the docking station to the mobile communication device is an inductive energy transmission that charges the mobile communication device;
   a detector configured to monitor the wireless energy transmission between the docking station and the mobile communication device, wherein the detector is further configured to detect when the mobile communication device approaches the docking station based on a change in energy in the energy field and generate data based on the detected change in the energy;
   a modulator configured to modulate the wireless energy transmission between the docking station and the mobile communication device; and
   a key generator for generating the key data using the data generated by the detector,
   wherein the first data transmission device is configured to encrypt the data transmission between the docking station and the mobile communication device based on the generated key data, and
   wherein the modulator is further configured to modulate the energy transmission between the docking station and the mobile communication device based at least partially on the generated key data.

2. The docking station for a mobile communication device as claimed in claim 1, further comprising:
   a communication interface configured to provide a signal based on data transmission by the first data transmission device.

3. The docking station for a mobile communication device as claimed in claim 2, wherein the communication interface is configured to provide an input and output signal based on bidirectional data transmission by the first data transmission device.

4. A wireless docking system comprising:
   a docking station comprising:
      a first data transmission device configured to carry out wireless data transmission between the docking station and a mobile communication device, and vary a transmission power of the wireless data transmission, wherein the first data transmission device is further configured to limit the transmission power to a predetermined value until a predefined registration process including an interchange of key data has been concluded between the docking station and the mobile communication device;
      a first energy transmission device configured to generate an energy field and carry out wireless energy transmission between the docking station and the mobile communication device, wherein wireless energy transmitted from the docking station to the mobile communication device is an inductive energy transmission that charges the mobile communication device;
      a detector configured to monitor the wireless energy transmission between the docking station and a mobile communication device, wherein the detector is configured to detect when the mobile communication device approaches the docking station based on a change in energy in the energy field and generate data based on the detected change in the energy;
      a modulator configured to modulate the wireless energy transmission between the docking station and the mobile communication device; and
      a key generator for generating the key data using the data generated by the detector, wherein the first data transmission device is configured to encrypt the data transmission between the docking station and the mobile communication device based on the generated key data, and wherein the modulator is further configured to modulate the energy transmission between the docking station and the mobile communication device based at least partially on the generated key data; and the mobile communication device comprising:
- a second data transmission device configured to carry out the wireless data transmission with the first data transmission device of the docking station; and
- a second energy transmission device configured to carry out the wireless energy transmission with the first energy transmission device of the docking station.

5. The wireless docking system as claimed in claim 4, wherein the second energy transmission device of the mobile communication device comprises a demodulator configured to extract a data signal from the wireless energy transmission.

6. The wireless docking system as claimed in claim 5, wherein the extracted data signal comprises the key data for encrypted transmission between the first data transmission device and the second data transmission device.

7. A method for coupling a docking station and a mobile communication device, the method comprising:
- generating an energy field by the docking station;
- detecting when the mobile communication device approaches the docking station based on a change in energy in the energy field;
- generating data based on the detected change in the energy;
- initializing wireless energy transmission from the docking station to the mobile communication device, wherein wireless energy transmitted from the docking station to the mobile communication device is an inductive energy transmission that charges the mobile communication device;
- generating key data for encrypted data interchange between the docking station and the mobile communication device using the data generated by the detector;
- modulating the wireless energy transmission between the docking station and the mobile communication device using the generated key data;
- interchanging the key data between the docking station and the mobile communication device at least partially with an inclusion of the wireless energy transmission from the docking station to the mobile communication device; and
- setting up an encrypted data connection between the docking station and the mobile communication device,
- wherein a transmission power of a wireless data transmission is limited to a predetermined value until the interchanging of the key data has been concluded between the docking station and the mobile communication device.

8. The docking station for a mobile communication device as claimed in claim 1, wherein the docking station is integrated in a piece of furniture.

9. The wireless docking system as claimed in claim 4, wherein the mobile communication device is a notebook computer, tablet personal computer, or mobile telephone.

* * * * *